UNITED STATES PATENT OFFICE.

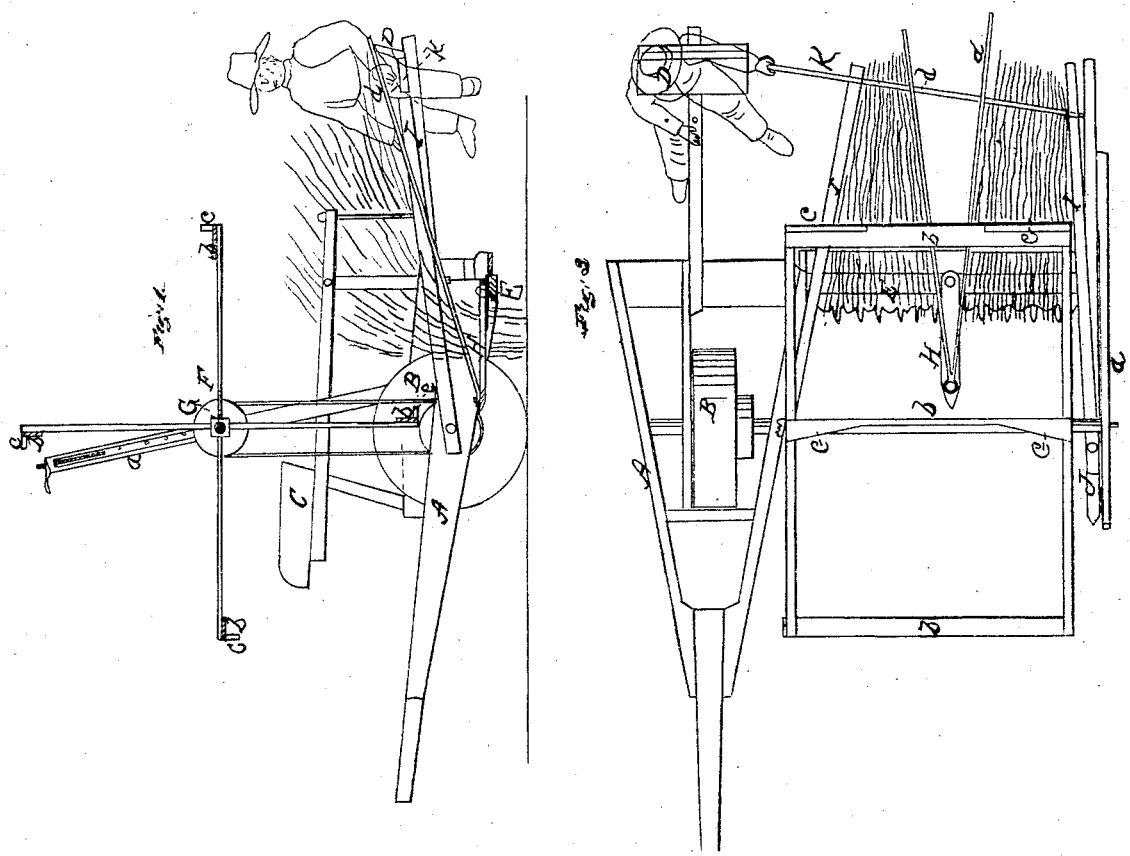

J. B. McCORMICK, OF VERSAILLES, KENTUCKY.

IMPROVEMENT IN HARVESTERS.

Specification forming part of Letters Patent No. 20,080, dated April 27, 1858.

*To all whom it may concern:*

Be it known that I, J. B. McCORMICK, of Versailles, in the county of Woodford and State of Kentucky, have invented a new and useful Improvement in Harvesters for Harvesting either Grain or Hemp; and I do hereby declare that the following is a full, clear, and exact description of the same, reference being had to the annexed drawings, making part of this specification, in which—

Figure 1 is a side sectional elevation of my improvement. X X in Fig. 2 indicates the plane of section. Fig. 2 is a plan or top view of the same.

Similar letters of reference indicate corresponding parts in the two figures.

This invention relates to an improvement in a mode of discharging the cut grain or hemp from the machine, for which Letters Patent bearing date June 2, 1857, were granted to me.

The object of this invention is to facilitate the manual part of the work or process, as described in said Letters Patent, by causing the grain or hemp to be discharged upon the ground in compact gavels, and two at a time, by means hereinafter fully shown and described.

To enable those skilled in the art to make and use my invention, I will proceed to describe its construction and operation.

A represents the main frame of the harvester.

B is the driving-wheel.

C is the driver's seat, attached to the main frame and placed above the driving-wheel.

D is the attendant's seat, attached to a bar connected to the back part of the main frame.

E is the finger-bar, which is attached to the back part of the main frame A, the said finger-bar being provided with a reciprocating sickle, which may be operated by any of the known ways from the driving-wheel B.

F is the reel, the shaft G of which has its journals fitted in bars *a a*, arranged in any proper way. The beaters *b* of this reel have concave faces, as shown in Fig. 2. These concave faces may be formed by bolting taper or wedge-shaped pieces *c c* to the beaters, one at each end. The beaters *b* are about equal in length to the sickle.

To the center of the finger-bar E a bar, H, is permanently attached. This bar projects a certain distance from the finger-bar at right angles with it, and two rods, *d d*, are attached to the end of bar H, said rods projecting back as far or a little beyond the attendant's seat D. The rods *d d* incline gradually upward from their front to their back ends, and they slightly diverge from their front end, as shown in Fig. 2, the bar H and rods *d d* forming a separator, H', as hereinafter described.

I I' represent two inclined bars, one bar, I, being attached to the main frame A, and the other, I', being attached to a shoe or bar, J, at the outer end of the finger-bar E. These bars I I' extend back as far as the attendant's seat D.

K is a rod which is laid on the bars I I', and operated or manipulated by the attendant, as will be presently shown.

The operation is as follows: The driver is seated on the seat C, and an attendant is seated on the other seat, D. The attendant, having the rod K in his hands, places it, as soon as the machine commences moving, on the bars I I', parallel or nearly parallel with the finger-bar E. The sickle cuts the grain or hemp in the usual way, and the beaters *b*, as they strike the upper part of the grain or hemp, have a tendency to push or force the cut grain or hemp toward the center of the finger-bar, and the bar H' and rods *d d* serve as a separator and divide the cut grain or hemp into two parts or portions, the upper ends of which fall and rest upon the rod K, the lower ends resting on the finger-bar or a narrow platform connected therewith. (See red lines in Fig. 2.) When a requisite quantity of cut grain or hemp has fallen on the rod K the attendant withdraws it from the bars I I' and the gavels are discharged upon the ground, a gavel being formed at each side of the rods *d d*. As soon as the gavels are discharged the attendant immediately replaces the rod K on the bars I I' to receive the two succeeding gavels, and the operation is repeated.

By this improvement the cut grain or hemp is discharged in compact gavels, and two at a time, the separator H' dividing the cut grain or hemp, and the concave beaters *b*, in connection with the separator, serving to make the gavels compact. The rod K requires to be drawn to discharge the gavels only one-half as often as in my patented machine previously alluded to. The gavels are also laid or discharged upon the ground in an even and perfect state in far better condition than can be done by any automatic device that has as yet come under my observation.

I would remark that although two bars, I I', are described, one bar, I', may answer, as the attendant may support the end of the rod where he grasps it.

I would also remark that the seat D on the machine may be varied according to the position of the sickle. In those machines where the sickle is placed in front of the driving-wheel the seat will be by the side of the wheel, or in that vicinity; but the relative position of the seat, sickle, and separator will not vary materially from that herein described.

I do not claim a rod, K, placed on bars and so manipulated by the attendant as to form an adjustable or movable rest or platform for the ready discharge of the cut grain or hemp in gavels, for such device has been used in connection with certain concomitant parts, and was formerly patented by me; but

What I claim as my invention, and desire to secure by Letters Patent, is—

The separator H', formed of the bar H and rods $d\ d$, in combination with the adjustable rod K, bars I I', one or more, seat D, and reel provided with concave beaters, when the several parts are constructed, relatively arranged, and operated as and for the purpose set forth.

J. B. McCORMICK.

Witnesses:
   A. C. TODDIN,
   WM. R. BAKER.